United States Patent
Lawrence et al.

(10) Patent No.: US 8,266,051 B2
(45) Date of Patent: Sep. 11, 2012

(54) BIOMETRIC RISK MANAGEMENT

(75) Inventors: David Lawrence, New York, NY (US); Carl Young, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 120 days.

(21) Appl. No.: 12/688,812

(22) Filed: Jan. 15, 2010

(65) Prior Publication Data

US 2010/0198722 A1    Aug. 5, 2010

Related U.S. Application Data

(63) Continuation of application No. 10/465,435, filed on Jun. 19, 2003, now Pat. No. 7,676,426, and a continuation-in-part of application No. 10/074,584, filed on Feb. 12, 2002, now abandoned, which is a continuation-in-part of application No. 10/021,124, filed on Oct. 30, 2001, now abandoned, which is a continuation-in-part of application No. 09/812,627, filed on Mar. 20, 2001.

(60) Provisional application No. 60/390,648, filed on Jun. 21, 2002.

(51) Int. Cl.
*G06Q 40/00*    (2012.01)

(52) U.S. Cl. ............... 705/38; 705/35; 705/44

(58) Field of Classification Search ............ 705/38, 705/35, 44
See application file for complete search history.

(56) References Cited

U.S. PATENT DOCUMENTS

| | | | | |
|---|---|---|---|---|
| 5,991,743 | A * | 11/1999 | Irving et al. | 705/36 R |
| 6,119,103 | A * | 9/2000 | Basch et al. | 705/35 |
| 7,161,465 | B2 * | 1/2007 | Wood et al. | 340/5.2 |
| 2001/0029493 | A1 * | 10/2001 | Pare et al. | 705/64 |
| 2002/0035543 | A1 * | 3/2002 | Shedd et al. | 705/44 |
| 2002/0099651 | A1 * | 7/2002 | May | 705/38 |
| 2003/0018522 | A1 * | 1/2003 | Denimarck et al. | 705/14 |
| 2003/0187790 | A1 * | 10/2003 | Swift et al. | 705/40 |
| 2003/0195843 | A1 * | 10/2003 | Matsuda et al. | 705/39 |
| 2004/0111379 | A1 * | 6/2004 | Hicks et al. | 705/76 |
| 2006/0010063 | A1 * | 1/2006 | Drummond et al. | 705/35 |
| 2007/0219882 | A1 * | 9/2007 | May | 705/35 |

* cited by examiner

*Primary Examiner* — Jagdish Patel
*Assistant Examiner* — Kevin Poe
(74) *Attorney, Agent, or Firm* — Perkins Coie LLP (57) ABSTRACT

The present invention provides methods and systems for managing Risk by associating a biometric profile with other data relevant to a Risk subject. Computerized systems can receive informational data that relates generally to Risk variables and relate the information to known biometric profiles. Compiled information can be situated and conveyed to a compliance department and be able to demonstrate to regulators that a financial institution has met standards relating to Risk containment.

22 Claims, 6 Drawing Sheets

BIOMETRIC RISK MANAGEMENT

CROSS REFERENCE TO RELATED APPLICATIONS

This Application is a Continuation of prior U.S. patent application Ser. No. 10/465,435, filed Jun. 19, 2003, entitled, "BIOMETRIC RISK MANAGEMENT," which in turn claims the benefit of the filing date of U.S. Provisional application No. 60/390,648 entitled "Biometric Risk Management", filed Jun. 21, 2002 and is a continuation-in-part of a prior application entitled "Risk Management Clearinghouse", filed Feb. 12, 2002, and bearing the Ser. No. 10/074,584 which is a continuation-in-part of a prior application also entitled "Risk Management Clearinghouse" filed Oct. 30, 2001, and bearing the Ser. No. 10/021,124, which is also a continuation-in-part of a prior application entitled "Automated Global Risk Management" filed Mar. 20, 2001, and bearing the Ser. No. 09/812,627, all of which are relied upon and incorporated by reference.

BACKGROUND

This invention relates generally to a method and system for facilitating the identification, investigation, assessment and management of legal, regulatory, financial and reputational risks ("Risks"). In particular, the present invention relates to a computerized system and method for banks and non-bank financial institutions to access biometric profiles compiled on a worldwide basis and relate such profiles to other information gathered and a risk subject, such as a transaction, wherein the information is conducive to quantifying and managing financial, legal, regulatory and reputational Risk associated with the transaction.

An increased awareness of fraud, money laundering and terrorism activities has prompted numerous security provisions to be implemented relating to transactions and in particular financial transactions. One area of security relating to an event, including a financial transaction, includes recording an image of a participant to the event. Such an event can include something as simple as gaining access to a building or executing a simple banking transaction.

Typically, a recorded image is utilized to memorialize an event or transaction or to perform a visual correlation between a proffered photo ID and a person offering the photo ID. These measures are good unto themselves, but offer little prophylactic protection. An individual's identity can be verified by digitally measuring selected features of the individual and comparing these features against the previously stored biological measurements can be utilized to ascertain an individuals identity.

Additional security measures can be linked to network access or general security and Risk management. Such security measures can include biometrics. One area of security relating to an event, including a financial transaction, includes recording an image or other biometrics of a participant to the event. Such an event can include something as simple as gaining access to a building or executing a simple banking transaction.

Typically, a recorded image is utilized to memorialize an event or transaction or to perform a visual correlation between a proffered photo ID and a person offering the photo ID. These measures are good unto themselves, but offer little prophylactic protection.

As money-laundering and related concerns have become increasingly important public policy concerns, regulators have attempted to address these issues by imposing increasing formal and informal obligations upon financial institutions. Government regulations authorize a broad regime of record-keeping and regulatory reporting obligations on covered financial institutions as a tool for the federal government to use to fight drug trafficking, money laundering, and other crimes. The regulations may require financial institutions to file currency and monetary instrument reports and to maintain certain records for possible use in tax, criminal and regulatory proceedings. Such a body of regulation is designed chiefly to assist law enforcement authorities in detecting when criminals are using banks and other financial institutions as intermediaries for, or to hide the transfer of funds derived from, criminal activity.

Obligations include those imposed by the Department of the Treasury and the federal banking regulators which adopted suspicious activity report ("SAR") regulations. SAR regulations require that financial institutions file SARs whenever an institution detects a known or suspected violation of federal law, or a suspicious transaction related to a money laundering activity or a violation of the Bank Secrecy Act (BSA).

Regulations can impose a variety of reporting obligations on financial institutions. Perhaps most broadly relevant for the present invention, regulations require an institution to report transactions aggregating to $5,000 that involve potential money laundering or violations if the institution, knows, suspects, or has reason to suspect that the transaction involves funds from illegal activities, is designed to disguise such funds, has no business or legitimate purpose, or is simply not the sort of transaction in which the particular customer would normally be expected to engage, and the institution knows of no reasonable explanation for the transaction after examining the available facts.

For example, banks must retain a copy of all SARs and all supporting documentation or equivalent business records for five (5) years from the date of the filing of the SAR. Federal banking regulators are responsible for determining financial institutions' compliance with the BSA and implementing regulations.

Federal regulators have made clear that the practical effect of these requirements is that financial institutions are subject to significant obligations to "know" their customer and to engage in adequate monitoring of transactions.

Risk associated with an account involved in international transactions can be greatly increased due to the difficulty in gathering and accessing pertinent data on a basis timely to managing Risk associated with the transaction. As part of due diligence associated with performing a Financial Transaction, it is imperative for a financial institution to "Know Their Customer" including whether a customer is contained on a list of restricted entities published by the Office of Foreign Access Control (OFAC), the Treasury Office or other government or industry organization. In addition, it is important to know that the person presenting themselves as a customer is in fact the customer and not an imposter.

System and methods previously disclosed offer assistance in ascertaining whether a name of a customer is associated with information that may be indicative of high Risk; however there is no method or system to tie such information to association with physical or biometric profiles. What is needed is a method and system to address Risk containment prophylactically through the use of biometric data.

SUMMARY

Accordingly, the present invention provides methods and systems for managing Risk by associating a biometric profile with other data relevant to a Risk subject. Computerized systems can receive informational data that relates generally to Risk variables and relate the information to known biometric profiles. Compiled information can be situated and conveyed to a compliance department and be able to demonstrate to regulators that a financial institution has met standards relating to Risk containment.

Embodiments can include methods and systems for managing Risks. Data descriptive of informational artifacts with content related to Risk is received into a computer system. In addition, data descriptive of one or more biometric measurements is received into the computer system. The computer system associates one or more Risk variables relating to a financial transaction with the received data descriptive of a biometric measurement and provides an indication of one or more informational artifacts that are associated with any of the Risk variables associated with the data descriptive of the biometric measurement. Alternatively, the computer system can provide an indication that none of the informational artifacts are associated with any of the Risk variables associated with the biometric measurement.

In some embodiments, the computer system can generate a Risk quotient indicative of a quantitative amount of Risk associated with the financial transaction. The Risk quotient can be based upon at least one informational artifact associated with the Risk variables.

In another aspect, some embodiments can include the computer generating a report that includes a description of informational artifacts associated with any Risk variables identified.

Still other aspects can include some embodiments where the computer system generates a suggested action based upon to informational artifacts associated with the Risk variables identified.

In some embodiments, the computer system can complete additional steps, such as: organizing the received data descriptive of a biometric measurement into multiple biometric profiles with each profile associated with a person and establishing one or more links between disparate biometric data profiles. The one or more Risk variables relating to a financial transaction can be associated with one or more linked biometric profiles.

Embodiments can also include, organizing the received data descriptive of a biometric measurement into multiple biometric profiles, with each profile associated with a person and establishing one or more links between disparate biometric data profiles. The data relating to a biometric profile can include more than one distinct physiological feature.

Additional embodiments can include a method of conducting a financial transaction. These embodiments can include transmitting the details descriptive of a particular financial transaction to a computer system accessible via a communications network. The computer server can be operative with executable software to implement the steps described above. A Subscriber can receive the data descriptive of the content of the at least one informational artifact associated with the Risk variables associated with the biometric profile and determine a course of action related to the financial transaction based upon the data descriptive of the content of the at least one informational artifact associated with the Risk variables associated with the biometric profile.

Other embodiments can include: computer systems, a digital data stream, and a computer readable medium that include software operative with a processor for implementing the steps described. In addition, various features and embodiments are further described in the following figures, drawings and claims.

DETAILED DESCRIPTION

The present invention includes a computerized method and system for managing Risk associated with a financial transaction. A computerized system gathers and stores information, such as public documents, as data in a database or other data storing structure and relates the information to a biometric profile as part of Risk management due diligence. Documents and sources of information can also be stored. A Subscriber, such as a Financial Institution, can submit a biometric profile for which a Risk inquiry search can be performed. The Risk inquiry search can be conducted which relates the biometric profile to Risk variable data gathered on a global basis. Biometric Risk inquiry searches can be automated and made a part of standard operating procedure for each transaction conducted by the Subscriber that involves a biometric measurement.

Definitions

Financial Institution: Financial Institution refers to any person, entity, company, corporation or statutory "person" in the business of providing Financial Transactions. As such, as used herein, a Financial Institution can collectively and individually include: Bank and non-bank financial institutions, including: investment banks; merchant banks; commercial banks; securities firms, including broker dealers securities and commodities trading firms; asset management companies, other hedge funds, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory Risks and associated obligations.

Financial Transaction: a Financial transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions; a transaction involving any transfer of funds and: an insurance company, a credit card issuer, a trading exchange, a government regulator, a law enforcement agency, an investment and/or merchant bank, public and private financing, commodities and securities trading, commercial and consumer lending, asset management, a rating of corporations and securities, public and private equity investments, public and private fixed income investments, the listing of companies on securities exchanges and bourses; and employee screening.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Proprietary Risk Management Clearinghouse (PRM): PRM refers to computerized systems and methods available to Subscribers permitted to access the computerized systems under the authorization of a parent entity. The computerized systems and methods being utilized for managing Risks and associating information and/or informational artifacts useful for quantifying Risk with a Risk subject. Generally, the functionality of a PRM is equivalent to functionality provided by a RMC system, except that data stored in the PRM and access to the PRM can be kept proprietary to the parent entity or some other designated group of users.

Risks: Risks associated with a financial transaction can include factors associated with security Risk, financial Risk, legal Risk, regulatory Risk and reputational Risk. A Security Risk refers to breach of a safety measure that may result in unauthorized access to a facility; unauthorized access to data; physical harm, including threat of immediate Risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational Risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: 10/074,584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Risk Variable: A Risk Variable refers to any data that can cause a Risk level associated with a Financial Transaction to change. Risk Variables can include, for exemplary purposes: involvement of a Transaction Participant with a sovereign state, a geographic area, a shell bank, a correspondent account, a politically identified person, a history of fraud, embargoes, sanctions, disbarment; a position held by the transaction participant; a country in which the position is held; how long the position has been held; the veracity of previous dealings with persons from the country in which the position is held; the propensity of people in similar positions to execute unlawful transactions; the propensity of people in similar positions to execute unethical transactions; and the type of account or other factors.

Subscriber: Subscriber refers to any Financial Institution, statutory person or other entity authorized to access a RMC system 106.

Transaction Participant: Transaction Participant refers to a person who will partake in a Financial transaction.

Elements

An individual's identity can be verified by digitally measuring selected features of the individual and comparing these features against the previously stored records of biological traits. A computer system can integrate an individual's pictures into a database which can include an image database, text database, and transaction log and the like. For example, a digital image of an individual can be converted into face vectors which can be stored in a transaction log database along with time, date, and identity number. Other pertinent data which can also be received and stored can include, for example: name, address, telephone number, previous history of fraud, links to known suspects or political figures, entry on a government list, association with a known terrorist or money launderer, association with a political figure, Social Security Number, date of birth, and family relations, or other data.

Biometrics can also be incorporated into a system to automatically detect human presence, locate and track faces, extract face images, provide retina measurements or fingerprints, perform identification by matching against a database of people it has seen before or pre-enrolled images or biometrics.

To determine someone's identity in identification mode, a biometric system can compute a degree of overlap between the live image and images associated with known individuals stored in a database of facial images and biometrics. It can return a list of possible individuals ordered in diminishing relevance, or it can return an identity of a subject according to an algorithm or artificial intelligence routines and an associated Risk quotient.

Other embodiments can allow a Financial Institution, or, other Subscriber, to automatically capture a facial image or other biometrics, such as a retina scan, of an individual within their field of operation and perform a one-to-many match against a database of known individuals. When a match is made, information related to the individual can be presented to the Subscriber. The Subscriber can decide what appropriate further action should be taken. Embodiments can also include transmitting one or more other known images of the individual to the Subscriber for confirmation of the individual's individual such that live scan systems are used to confirm the identity of a subject as the subject transverses through an event or transaction.

The information from face recognition systems can be combined with information from other technologies. Among the many "biometric" identification technologies, face recognition requires the least cooperation from the individual.

Automatic fingerprint reading, by contrast, requires an individual to press a finger against a machine. It will eventually be possible to identify people by the DNA-bearing cells that they leave behind, but that technology is a long way from becoming ubiquitous.

Biometrics can be also added to a network access login procedure in order to associate a network ID or other network access with a physical person and forwarded to a RMC system 106 where the network logon can be with associated Risk variable related data. Therefore biometric data including a facial image, retina scan, fingerprint, or other biometrics can be input into a network access device as part of a routine login procedure. The biometric input can be the subject of a RMC database inquiry in order to conduct due diligence.

Biometric identification can be particularly useful in the case of transactions involving foreign participants. Foreign states may not have as high a regulatory standard pertaining to knowing their customer and a correspondent bank may have little or no knowledge to pass on. A simple biometric record can be made and transmitted along with a proposed transaction such a that a U.S. hank can perform due diligence according to the biometric records retained on suspect individuals, organizations, geographic areas, governments, or other criteria.

Figure 1:
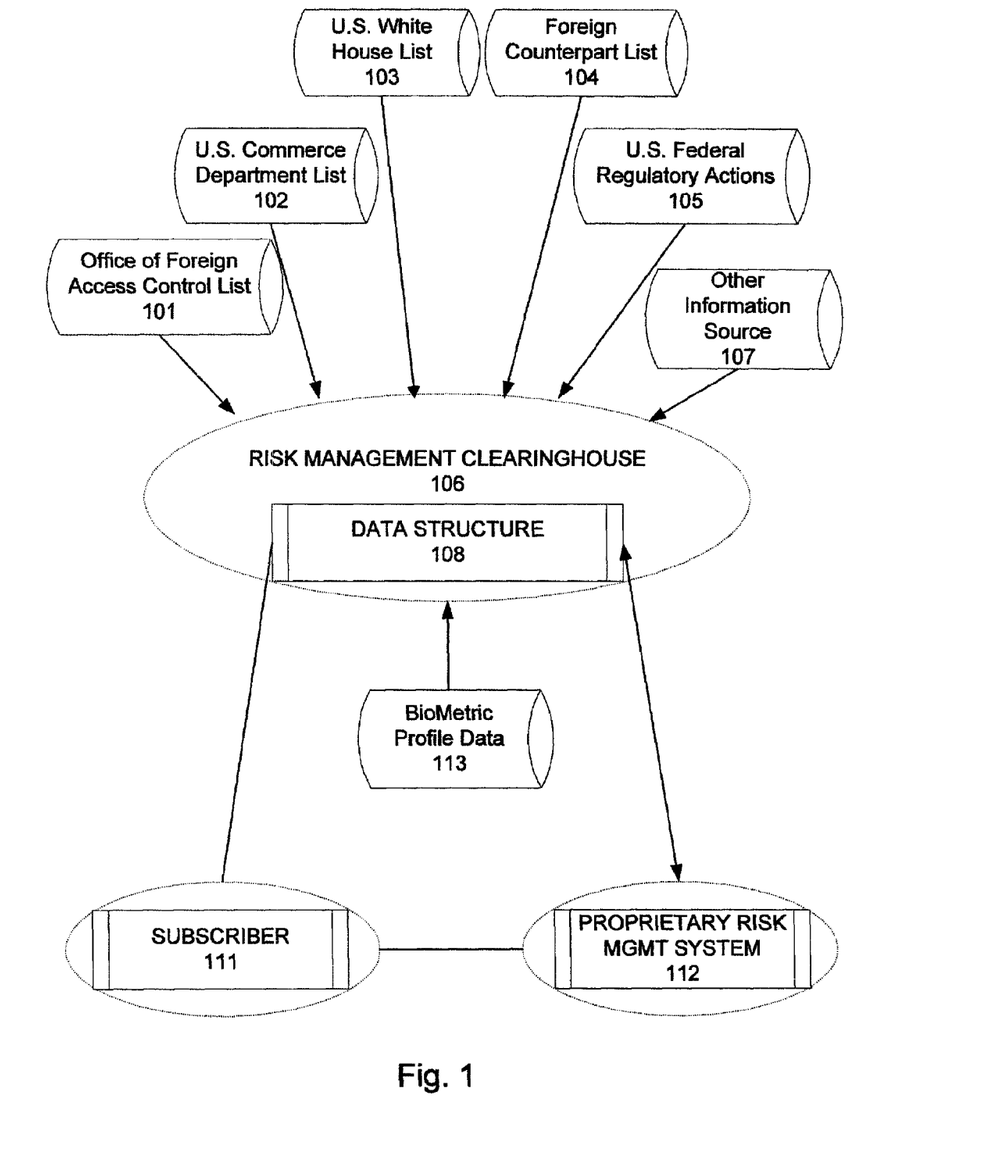
FIG. 1 illustrates a block diagram that can embody the present invention.

Referring now to FIG. 1 a block diagram of some embodiments of the present invention is illustrated. A RMC system 106 gathers and receives informational data that may be related to Risk variables in a financial transaction. Information may be received, for example, from publicly available sources 101-105, Subscribers 111, investigation entities, or other sources. The information can include data biometric containing biometric profiles 113, such as a photo image of an individual. The biometric data 108 can be linked to other information gathered. The information that the biometric data 108 is linked to can include data more commonly utilized to identify an individual, such as a name and address or social security number (SSN). However, the biometric data 108 does not have to be linked to a name and address if one is not available, or if such association would be counter to a prevailing law, such as the Fair Credit Reporting Act (FCRA).

Information gathered by the RMC system 106 can be constantly updated such that it can be current as compared to a financial transaction or an alert list and facilitate compliance with regulatory requirements. The RMC system 106 facilitates due diligence on the part of a Subscriber 111 by gathering, structuring and providing to the Subscriber 111 data that relates to Risk variables involved in a financial transaction.

In addition a RMC system can gather and receive information, which relates to biometric profiles 113 and relates the biometric profiles 113 to the Risk variable data. Biometric profiles 113 can include computerized verification of an individual based upon physiological or behavioral characteristics, such as, for example, facial structure, facial features, hand geometry, finger shape, retina structure, habituated hand movements, voice prints, finger prints, vein patterns or other unique physiological features. A profile can be collected, for example, by taking a digital picture of a person conducting a transaction. Other embodiments can include, for example, collecting a fingerprint scan or a retina scan of an individual involved in a transaction.

A biometric profile can be useful in ascertaining who a customer seeking to become a Transaction Participant actually is so that a Risk clearing procedure can be more accurately performed.

A biometric profile can be related to a Risk variable either through first identifying the individual corresponding with the biometrics and relating the Risk variable to the identified individual, or by independently associating the biometric profile with Risk variables and allowing the common identification of the individual to remain undisclosed.

Some embodiments can therefore include a RMC system 106 which contains data 108 representing a photo image of a man who has one or more associations with a terrorist organization. An identity of the man may or may not be known. If a bank captures an image of the man as he requests that the bank perform a transaction, such as a money transfer, the RMC system 106 can run an inquiry against the RMC data 108 which will return a result indicating the association with the terrorist organization. The bank can then take an appropriate action based upon information transmitted to the bank indicative of the inquiry result. An important aspect of biometric Risk management is that even if a high Risk individual takes measures to disguise the individual's identity, such as present falsified identification papers, grow facial hair, wear a wig, biometrics can be effective at making an association of the individual with other information indicating a high Risk. Of course, if the information is available, biometrics may also be effective at associating the individual with other aliases also.

Utilization of biometric data 108 for conducting RMC searches can also offer several advantages over artificially implemented identification mechanisms, such as a system checking a social Security Number, personal identification number (PIN), magnetic card, smart card, or other device, since a biometric profile can provide a more positive source of identification data. Whereas an artificial identification system such as a magnetic card and PIN can only ascertain if the person who is performing a transaction has access to a required card and PIN, a biometric profile provides data relating to who the person is that is conducting the transaction.

Traditional methods of identification, such as: the need to procure an official photographic identification, such as a drivers license or passport; signature identification; PIN entry; disclosing a personal address or telephone number; confirming a name of a close relative; or other requirement, can be an impediment and inconvenience to a transaction. A biometric measurement can be collected to construct a profile with very little or imperceptible inconvenience to a party to a transaction and processed with very little training on the part of any Financial Institution personnel.

Risk Variable related information that can be associated or linked to biometric information can be received from multiple sources including formalized lists, such as, for example: a list generated by the Office of Foreign Assets Control (OFAC) 101 including their sanction and embargo list, a list generated by the U.S. Commerce Department 102, a list of international "kingpins" generated by the U.S. White House 103, foreign Counterpart list 104, U.S. regulatory actions 105 or other information source 107 such as a foreign government, U.S. adverse business-related media reports, U.S. state regulatory enforcement actions, international regulatory enforcement actions, international adverse business-related media reports, a list of politically connected individuals and military leaders, list of U.S. and international organized crime members and affiliates, a list put forth by the Financial Action Task Force (FATF), a list of recognized high Risk countries, or other source of high Risk variables. Court records or other references relating to fraud, bankruptcy, professional reprimand or a rescission of a right to practice, suspension from professional ranks, disbarment, prison records or other source of suspect behavior can also be an important source of information.

Of additional interest can be information indicative that an entity is not high Risk such as a list of corporations domiciled in a G-7 country, or a list of entities traded on a major exchange.

Similarly, financial investments can include investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

A Subscriber 111, such as a financial institution, will often be closely regulated. As a result financial institutions are exposed to significant Risks from their obligations of compliance with the law and to prevent, detect and, at times, report potential violations of laws, regulations and industry rules ("laws"). These Risks include, but are not limited to, the duty to disclose material information, and to prevent and possibly report: fraud, money laundering, foreign corrupt practices, bribery, embargoes and sanctions. Timely access to relevant data on which to base a compliance related action can be critical to conducting business and comply with regulatory requirements such as those set forth by the Patriot Act in the United States. Biometric information for creating a profile can often be easily collected and transmitted and is not typically subject to uncertainties that can accompany language barriers, misspellings, typographic errors, or other limitations to traditional data.

A financial institution can integrate a RMC system 106 to be part of legal and regulatory oversight for various due diligence and "know your customer" obligations imposed by regulatory authorities. The RMC system 106 can facilitate detection and reporting of potential violations of law. Similarly, the RMC system 106 can support a financial institution's effort to meet requirements regarding the maintenance of accurate books and records relating to their financial transactions and affirmative duty to disclose material issues affecting an investor's actions.

Information gathered from a diversity of data sources can be aggregated into a searchable data storage structure 108. A source of gathered information can also be received and stored. In some instances, a Subscriber 111 may wish to receive information regarding the source of information received. Gathering data into an aggregate data structure 108, such as a data warehouse allows a RMC system 106 to have the data 108 readily available for processing a Risk management search associated with a Risk subject. Aggregated data 108 can also be scrubbed or otherwise enhanced.

In some embodiments which include enhancing data, data scrubbing can be utilized to implement a data warehouse comprising the aggregate data structure 108. The data scrubbing takes information from multiple databases and stores it in a manner that gives faster, easier and more flexible access to key facts. Scrubbing can facilitate expedient access to accurate data commensurate with the critical business decisions that will be based upon the Risk management assessment provided.

In such embodiments, various data scrubbing routines can be utilized to facilitate aggregation of Risk variable related information. The routines can include programs capable of correcting a specific type of mistake, such as an incomprehensible address, or clean up a full spectrum of commonly found database flaws, such as field alignment that can pick up misplaced data and move it to a correct field or removing inconsistencies and inaccuracies from like data. Other scrubbing routines can be directed directly towards specific legal issues, such as money laundering or terrorist tracking activities.

For example, a scrubbing routine can be used to facilitate various different spelling of one name. In particular, spelling of names can be important when names have been translated from a foreign language into English. For example, some languages and alphabets, such as Arabic, have no vowels. Translations from Arabic to English can be very important for financial institutions seeking to be in compliance with lists supplied by the U.S. government that relate to terrorist activity and/or money laundering. A data scrubbing routine can facilitate Risk variable searching for multiple spellings of an equivalent name or other important information. Such a routine can enhance the value of the aggregate data gathered and also help correct database flaws.

Retrieving information related to Risk variables from the aggregated data is an operation with the goal to fulfill a given a request. In order to process request against a large document set of aggregated Risk data with a response time acceptable to the user, it may be necessary to utilize an index based approach to facilitate acceptable response times. Less sophisticated processes, such as a direct string comparison based search against an entire data set may result in performance issues.

Some embodiments can therefore include, an index file for a collection of documents can therefore be built upon receipt of the new data. The index file can include a pointer to the document and also include important information contained in the documents the index points to. Responsive to a RMC query, the RMC system 106 can match the query against a representation of the data, instead of the entirety of the data. The RMC system 106 can retrieve datum, such as for example, informational data, informational artifacts and a description of informational artifacts which have been referenced by the indexes to satisfy the RMC query. However it may not be necessary to retrieve the full document as index records may also contain the relevant information gleaned from the documents they point to. This allows the user to extract information of interest without having to read the source document.

Two exemplary retrieval models which can be utilized in fulfilling a search request can include a Boolean model and a relevance model. A Boolean model can partition a document set into two portions, one which will fulfill a query and one which will not fulfill it. Relevance ranking can considers which of the documents are relevant and to what degree. Boolean logic models use exact matching. Relevance ranking models use fuzzy logic or vector space techniques wherein documents and queries are considered vectors in a multidimensional space, such that the shorter the distance between a document vector and a query vector, the more relevant is the document the document is deemed.

Some embodiments can also include augmenting data with data mining techniques that can utilize software to analyze informational data stored in the warehouse. The software may use mathematical modeling, statistical analysis, pattern recognition, rule based trends or other data analysis tools. In contrast to traditional systems that may have gathered and stored information in a flat file and regurgitated the stored information when requested, such as in a defined report related to a specific Risk subject or other ad hoc access concerned with a particular query at hand, the present invention can provide Risk related searching that adds a discovery dimension by returning results that human operator reviewing flat files would find labor and cognitively intense.

Such a discovery dimension supplied by the RMC system 106 can be accomplished through the application of augmenting techniques, such as data mining applied to the Risk related data that has been aggregated. Data mining can include the extraction of implicit, previously unknown and potentially useful information from the aggregated data. This type of extraction can include unlooked for correlations, patterns or trends. Other techniques that can be applied can include fuzzy logic and/or inductive reasoning tools.

Augmenting routines can include enhancing available data with routines designed to reveal hidden data. Revealing hidden data or adding data fields derived from existing data can be very useful to Risk management. For example, little may be known about a proposed Transaction Participant. Data supplied by the proposed Transaction Participant may only include nominal information, such as information normally contained on a driver's license; however a biometric match to an digital image taken prior to the image may indicate a match with a mug shot from an individual who was convicted of fraud and also has ties with a foreign government on a list generated by the White House.

In some embodiments, a Subscriber 111 can access the RMC system 106 via a computerized system as discussed more fully below. The Subscriber can input a biometric measurement or profile, such as a photo image, a finger print, or a retina scan. The RMC system 106 receives the identifying information and performs a Risk related inquiry or search on informational data, which can include, for example raw data, scrubbed data and/or augmented data.

In other embodiments, a Subscriber 111 can house a computerized proprietary Risk management (PRM) system 112. The PRM system 112 can receive an electronic feed from a RMC system 106 with updated scrubbed data. In addition, data mining results can also be transmitted to the PRM system 112 or performed by the PRM system 112 for integration into the Risk management practices provided by in-house by the Subscriber.

Information entered by a Subscriber into a PRM system 112 may be information gathered according to normal course of dealings with a particular entity or as a result of a concerted investigation. In addition, since the PRM system 112 is proprietary and a Subscriber responsible for the information contained therein can control access to the information contained therein, the PRM system 112 can include information that is public or proprietary. If desired, information entered into the PRM system 112 can be shared with a RMC system 106. Informational data can be shared, for example via an electronic transmission or transfer of electronic media. However, RMC system 106 data may be subject to applicable local or national law and safeguards should be adhered to in order to avoid violation of such law through data sharing practices. In the event that a Subscriber, or other interested party, discovers or suspects that a person or entity is involved in a fraudulent or otherwise illegal activity, the system can report related information to an appropriate authority.

The RMC system 106 provides updated input into an in-house Risk management database contained in a PRM system 112. The utilization of a RMC system 106 in conjunction with a PRM system 112 can allow a financial institution, or other Subscriber, to screen biometric profiles 113 of any or all current and/or prospective account holders and/or wire transfer receipt/payment parties and associate the biometric profiles 113 with various due diligence checks on a low cost and timely basis.

A log or other stored history can be created by the RMC system 106 and/or a PRM system 112, such that utilization of the system can mitigate adverse effects relating to a problematic account. Mitigation can be accomplished by demonstrating to regulatory bodies, shareholders, news media and other interested parties that corporate governance is being addressed through tangible Risk management processes.

In the case of an automated transaction, such as, for example, execution of an online transaction, a direct feed of information can be implemented from a front end system involved in the transaction to the RMC system 106 or a PRM system 112. Apparatus for collecting biometric data 108, such as a digital camera, fingerprint scanner, retina scanner or other device.

The RMC system 106 can also receive open inquiries, such as, for example, from Subscriber personnel not necessarily associated with a particular transaction. An open query may, for example, search for biometric information relating to an individual not associated with a financial transaction. Measures can also be put in place to insure that all such inquiries should be subject to prevailing law and contractual obligations.

Some embodiments include a query which is automatically generated from monitoring transactions being conducted by a Subscriber 111. For example, a digital camera can automatically process an image of a face of a person performing a transaction. Programmable software can be utilized to formulate a query according to an image gathered, or other pertinent data, and run the query against a database maintained by the RMC system 106 or PRM system 112.

An alert inquiry containing biometric profiles 113 of interest to a Subscriber 111 can also be supplied to the RMC system 106 by a Subscriber 111 or other source. For example, an alert inquiry may contain a biometric profile for key employees or a prospective contractor that may have access to sensitive data. Each alert inquiry can be customized and specific to a Subscriber 111. The RMC system 106 can continually monitor biometric data 108 in its database according to an alert query and transmit related informational data to an interested party. In this manner, ongoing diligence can be conducted. In the event that new information is uncovered by the alert query, the Subscriber 111 can be immediately notified, or notified according to a predetermined schedule. Appropriate action can be taken according to the information uncovered. The RMC system 106 can quantify Risk due diligence by capturing and storing a record of information received and actions taken relating to a Financial Transaction. Once quantified, the due diligence data can be utilized for presentation, as appropriate, to regulatory bodies, shareholders, news media and/or other interested parties, such presentation may be useful to mitigate adverse effects relating to a problematic transaction. The data can demonstrate that corporate governance is being addressed through tangible Risk management processes.

In some embodiments, the RMC database can contain only information collected from publicly-available sources relevant for the detection and prevention of money laundering, fraud, corrupt practices, organized crime, activities subject to governmental sanctions or embargoes, or other similar activities that are the subject of national and/or global regulation. A Subscriber 111 will use the database to identify the possibility that a person related to a biometric profile is involved in such illegal activities or to monitor a customers' use of the Subscriber's financial services or product to identify transactions that may be undertaken in furtherance of such illegal activities.

A Subscriber 111 to the RMC system 106 will be able to access the database electronically and to receive relevant information electronically and, in specific circumstances, hard copy format. If requested, a RMC system 106 provider can alert a Subscriber 111 upon its receipt of new RMC system 106 entries concerning a previously screened biometric profile.

A Subscriber 111 can be permitted to access information in the RMC system 106 in various ways, including, for example: system to system inquires involving single or batch screening requests, individual inquiries for smaller screening requests, or through a web-based interface supporting individual inquiries.

In some embodiments, a RMC system 106 can take any necessary steps so as not to be regulated as a consumer reporting agency. Such steps may include not collecting or permitting others to use information from the RMC database to establish an individual's eligibility for consumer credit or insurance, other business transactions, or for employment or other Fair Credit Reporting Act (FCRA) covered purposes such as eligibility for a government benefit or license.

Since a biometric profile can be make a universal identification unrelated to artificial identifying criteria, such as name, social security number, employee number, and the like, prevailing law may allow information associated with a biometric profile but otherwise anonymous to be considered in business situations where other data may be prohibited.

Figure 2:
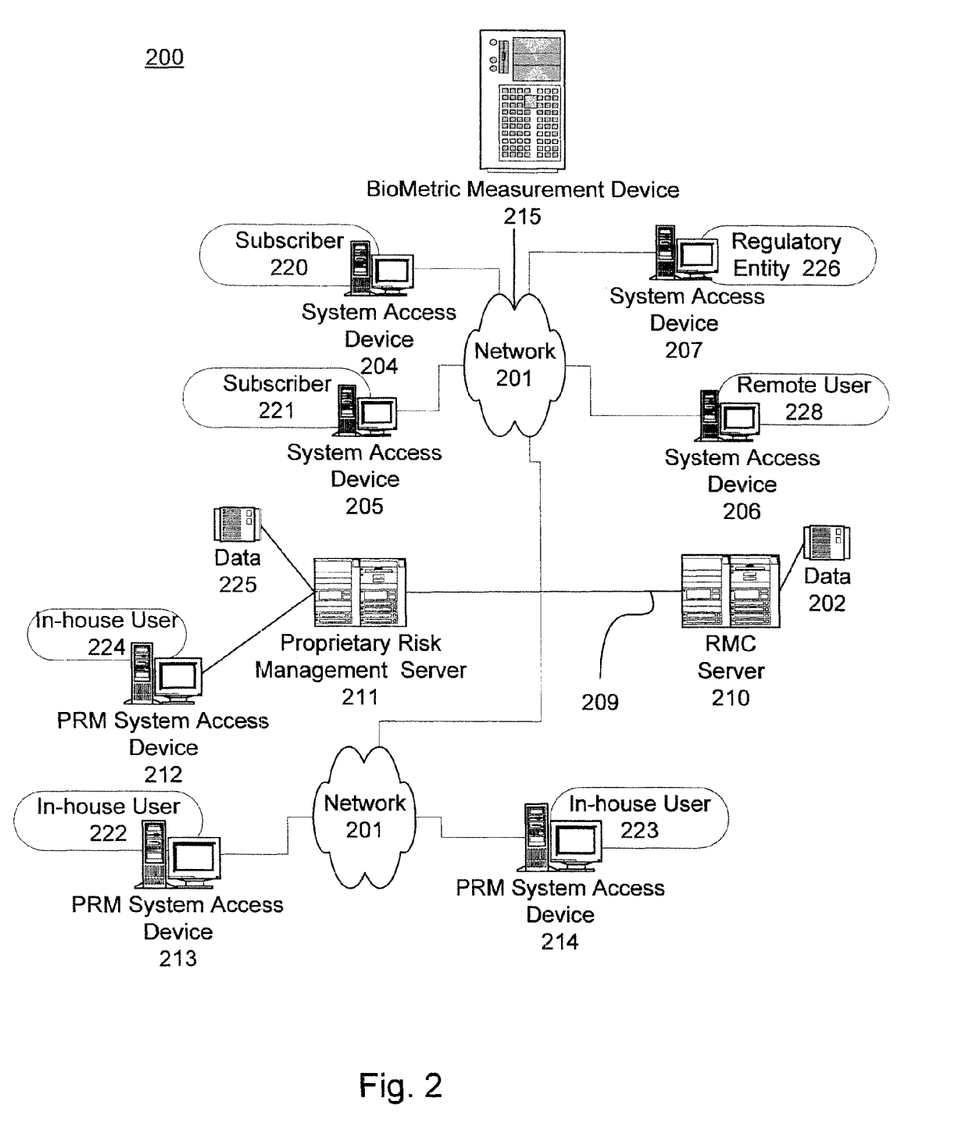
FIG. 2 illustrates a network of computer systems that can embody a biometric Risk management system.

Referring now to FIG. 2, a network diagram illustrating some embodiments of the present invention is shown 200. An automated RMC 106 can include a computerized RMC server 210 accessible via a distributed network 201 such as the Internet, or a private network. A Subscriber 220-221, regulatory entity 226, remote user 228, or other party interested in Risk management, can use a computerized system or network access device 204-207 to receive, input, transmit or view information processed in the RMC server 210. A protocol, such as the transmission control protocol internet protocol (TCP/IP) can be utilized to provide consistency and reliability.

In addition, a proprietary Risk management server 211 can access the RMC server 210 via the network 201 or via a direct link 209, such as a T1 line or other high speed pipe. The PRM server 211 can in turn be accessed by an in-house user 222-224 via a system access device 212-214 and a distributed network 201, such as a local area network, or other private network, or even the Internet, if desired. An in-house user 224 can also be situated to access the RMC server 210 via a direct link, or any other system architecture conducive to a particular need or situation. In some embodiments, a remote user can access the RMC server 210 via a system access device 206 also used to access other services. For the purposes of this application, any function or reference to a RMC server 210 can also include a PRM server 211 unless specifically stated, except that the PRM server 211 can also contain proprietary information that will not be shared outside of an organization except as allowed by prevailing applicable law. In addition, in some embodiments, a PRM server 211 may be utilized to calculate Risk quotients or other subjective valuations while a RMC server 210 may be limited by a RMC provider from providing any subjective analysis to a Subscriber 211 in order to comply with statutory or regulatory guidelines.

A computerized system or system access device 204-207 212-214 used to access the RMC server 210 can include a processor, memory and a user input device, such as a keyboard and/or mouse, and a user output device, such as a display screen and/or printer. The system access devices 204-207 212-214 can communicate with the RMC server 210 or the PRM server 211 to access data and programs stored at the respective servers 210-211. A system access device 212-214 may interact with Risk management servers 210-211 as if the Risk management servers 210-211 were a single entity in the network 200. However, the servers 210-211 may include multiple processing and database sub-systems, such as cooperative or redundant processing and/or database servers that can be geographically dispersed throughout the network 200.

The Risk management server 210-211 can include one or more databases 202 225 storing data relating to Risk management. The RMC server 210 may interact with and/or gather data from an operator of a system access device 220-224 226 228 or other source. Data received may be structured according to Risk variables and transmitted to Subscribers, and/or utilized to calculate a Risk quotient 108.

Typically an in-house user 222-224 or other user 220-221, 226, 228 will access the RMC server 210 using client software executed at a system access device 212-214. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the RMC server 210 to the client computer and executed at the system access device or computer as part of the RMC Risk management software.

Other implementations include proprietary software installed from a computer readable medium, such as a CD ROM or DVD. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
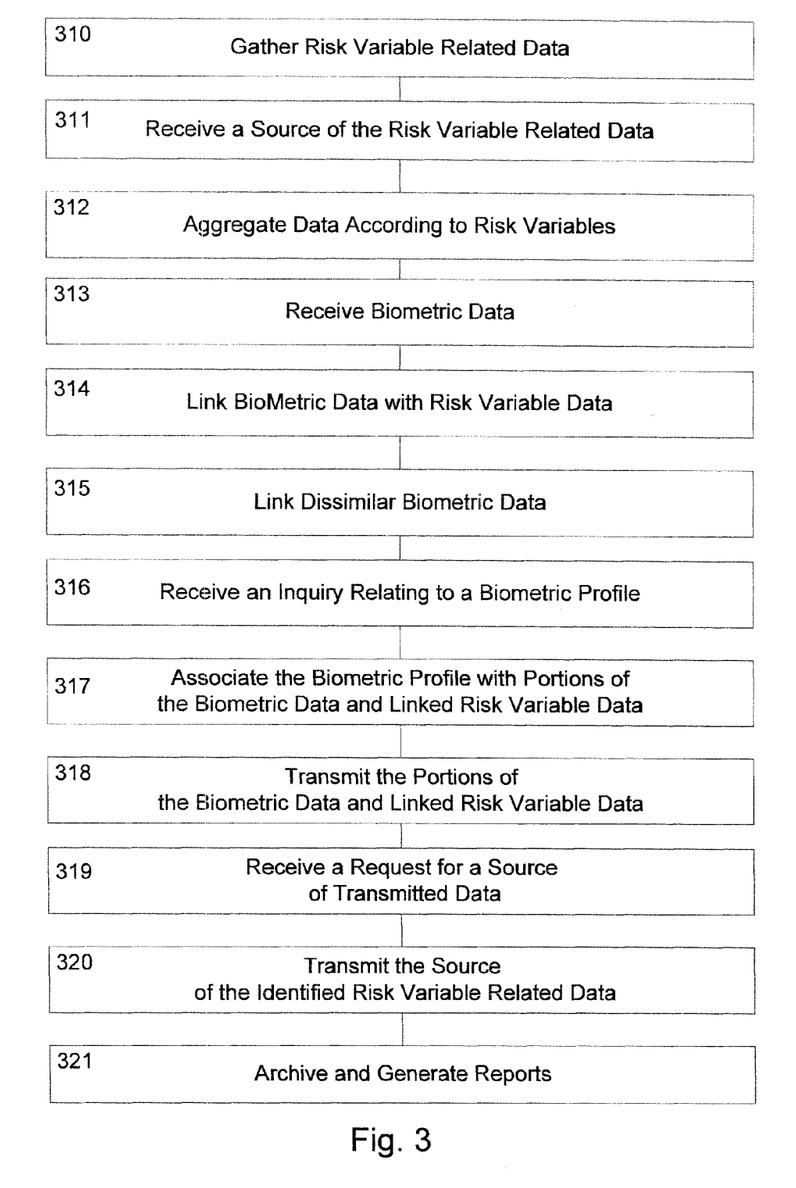
FIG. 3 illustrates a flow of exemplary steps that can be executed while implementing the present invention.

Referring now to FIG. 3, steps taken to manage Risk associated with a biometric profile can include gathering data relating to Risk entities and other Risk variables 310 and receiving the gathered information into a RMC server 210. Informational data can be gathered for example, from: a user such as a Financial Institution employee, a source of electronic data such as an external database, a messaging system, a news feed, a government agency, any other automated data provider, a party to a transaction, investigation firm, or other source. Typically, the RMC server 210 will gather data which relates to a current or potential transactor, beneficiary, institutional entity, geographic area, shell bank, or other related party. Information can be received on an ongoing basis such that if a new event occurs in the world that can affect the exposure of Risk subject, such as a transactor, a calculated Risk can be adjusted accordingly.

A source of Risk variable data can also be received 311 by the RMC server 210 or other provider of Risk management related data. In addition to the list of sources above from which data can be gathered, additional examples of sources can include: a government agency, an investigation firm, public records, news reports, publications issued by Treasury's Financial Crimes Enforcement Network ("FinCEN"), the State Department, the CIA, the General Accounting Office, Congress, the Financial Action Task Force ("FATF"), various international financial institutions (such as the World Bank and the International Monetary Fund), the United Nations, other government and non-government organizations, internet websites, news feeds, commercial databases, or other information sources.

The RMC server 210 can aggregate the data received according to Risk variables 312 or according to any other data structure conducive to fielding Risk.

A RMC server 210 can be accessed in real time, or on a transaction by transaction basis. In the real time embodiments, any changes to the RMC data 108 may be automatically forwarded to an in-house PRM system 106. On a transaction by transaction basis, the RMC system 106 can be queried for specific data that relates to variables associated with a particular transaction.

All data received can be combined and aggregated 312 to create an aggregate source of data which can be accessed to perform Risk management activities. Combining data can be accomplished by any known data manipulation method. For example, the data can be maintained in separate tables and linked with relational linkages, or the data can be gathered into on comprehensive table or other data structure. In addition, if desired, information received can be associated with one or more variables including a position held by the account holder or other transactor, the country in which the position is held, how long the position has been held, the strength of the position, the veracity of previous dealings with persons from that country, the propensity of people in similar positions to execute unlawful or unethical transactions, the type of transaction or other criteria.

In addition to the types and sources of Risk variable data listed previously that can provide indications of high Risk, received information can relate to variables such as: involving a financial institution that is not accustomed to foreign account activity; requests for secrecy or exceptions to Bank Secrecy Act requirements, routing through a secrecy jurisdiction, or missing wire transfer information; unusual and unexplained fund or transaction activity, such as fund flow through several jurisdictions or financial institutions, use of a government-owned bank, excessive funds or wire transfers, rapid increase or decrease of funds or asset value not attributable to the market value of investments, high value deposits or withdrawals, wires of the same amount of funds into and out of the account, and frequent zeroing of account balance; and large currency or bearer transactions, or structuring of transactions below reporting thresholds. Other Risk variable data can be received include activities a person or entity is involved in, associates of a transactor, governmental changes, attempting to open more than one account in the same time proximity, or other related events.

The RMC server 210 can also receive biometric data 313. In some embodiments, the biometric data can be received in an encrypted or hash format in order to preserve privacy or confidentiality that may be associated with the biometric data. In other embodiments, the biometric data can be public records that would not require encryption protection. In another aspect, biometric data can be received in the form of a biometric template, or other conversion of a comprehensive biometric profile or image into a shortened numerical representation of particular unique features included in the original profile. Biometric data can include data descriptive of different physiological features, for example, but not limited to: a voiceprint, hand geometry, retina scan, iris scan, fingerprint, hand image, unique vein pattern, tongue identification a body odor. Some embodiments can include an inquiry that references more than one set of biometric data wherein each set of biometric data is descriptive of a distinct physiological feature.

Specific sources of biometric data can include: public records, such as incarceration records; data collected as a result to a voluntary submission of the data; data gathered as a result of a concerted investigation; or from other sources.

Biometric data that is received can be linked or otherwise associated with Risk variable data collected 314. If necessary to complete the link, the biometric data can associate with other identifying information, such as a name, birth place, drivers license, passport, social security number, employee number or any other informational data that can uniquely identify an individual. In some embodiments, any algorithms or linking criteria can remain proprietary and confidential to the RMC provider such that the individual associated with the biometric data can remain anonymous in the traditional sense. Other embodiments can specifically show all algorithms and/or linking criteria so that the credibility of any associations can be determined by the ultimate user of the information. Linking the biometric data with other identifying data, such as, for example a name, can be useful in associating a biometric profile with Risk variable data gathered and stored in using traditional identification associations.

Biometric data can also be linked or otherwise associated with other biometric data 315, such as biometric data that references multiple distinct physiological features. In this aspect, of the present invention, one biometric measurement or profile, such as a retina scan can be linked to another biometric profile, such as, for example, a photo of an individual. Cross referencing of biometric profiles can provide an additional level of credibility to any findings. Cross referencing can also serve to ascertain any anomalies or inconsistencies in biometric data received which could indicate a fraud or deceit, such as, for example, a biometric profile of a retina scan that identifies one individual while a photo image identifies another individual.

The RMC server 210 can receive an inquiry relating to a biometric profile 316. The inquiry will typically be received from a Subscriber 111 who will want to assess Risk associated with an individual whom the profile describes. For example, a biometric profile can be descriptive of a party involved in a transaction. However a biometric profile can also be submitted for any other purpose that suits the Subscriber 111. For example, a Subscriber 111, or other submitting entity, may wish to quantify Risk associated with an individual who has accessed one of their facilities, or a person accompanying a person involved in a transaction, or the like.

A biometric inquiry can include, for example, transmission of a photo image, or other biometric profile, of a person who would like to open an account with a Financial Institution, or an individual who would like to participate in a transaction.

A RMC server 210 can associate a biometric profile that is part of an inquiry with portions of stored biometric data and linked Risk variable data 317. Association of the biometric profile can be accomplished with any known data processing method and can include the use of biometric templates or other mathematical representations of biometric data. Associations can include a minimum threshold for verification of an identity. In some embodiments, an inquiry result can include any data that includes a result that is above a threshold of mathematical association. The inquiry results can also include a degree of correlation of how likely the resultant data is linked to the biometric profile. For example, a biometric profile may return a 96% degree of correlation of the profile with a particular individual, the individual may be associated with multiple other Risk variable data records. Therefore the inquiry result would indicate that there was a 96% chance that the Risk variable data applied to the biometric profile. Similarly, the same inquiry may indicate that the there was a 82% degree of correlation that the biometric profile matched a second individual and therefore additional Risk variable data pertaining to that individual may also be part of an inquiry result with the qualification regarding the accuracy of the association.

Embodiments can include allowing a Subscriber 111 the ability to set a threshold level that the Subscriber 111 would like to receive results for pertaining to a particular search.

A minimum threshold can also be established such that no results that fall below a predetermined threshold would be returned as part of the inquiry results.

Association of a biometric profile with Risk variable data can be structured as a one to many search or a one to one search. A one to many search would receive a biometric profile and seek to match the profile with a profile contained in a database of biometric profiles. For example, a photo image on may be compared to a database of photo images of convicted felons to ascertain if the individual may be a felon. Another example of a one to many search can include searching a database of images of known individuals in order to discover any aliases or names that an associated individual may also be known as.

A one to one search can seek to ascertain whether a photo image, or other biometric profile, of a person representing themselves to be a particular individual, matches known biometric data relating to that particular individual.

The associated portions of aggregated data can be transmitted 318 to a party designated by the requesting Subscriber 111.

The RMC server 210 may also receive a request for the source of identified Risk variable related data 319, in which case, the RMC server 210 can transmit the source of any identified Risk variable related data to the requestor 320. The source may be useful in adding credibility to the data, or to follow up with to request additional information.

The RMC server 210 can also store in memory, or otherwise archive Risk management related data and proceedings and generate reports quantifying Risk management Risk procedures, executed due diligence, corporate governance or other matters 321. Archived Risk management related data and proceedings can be useful to quantify corporate governance and diligent efforts to address high Risk situations.

Figure 4:
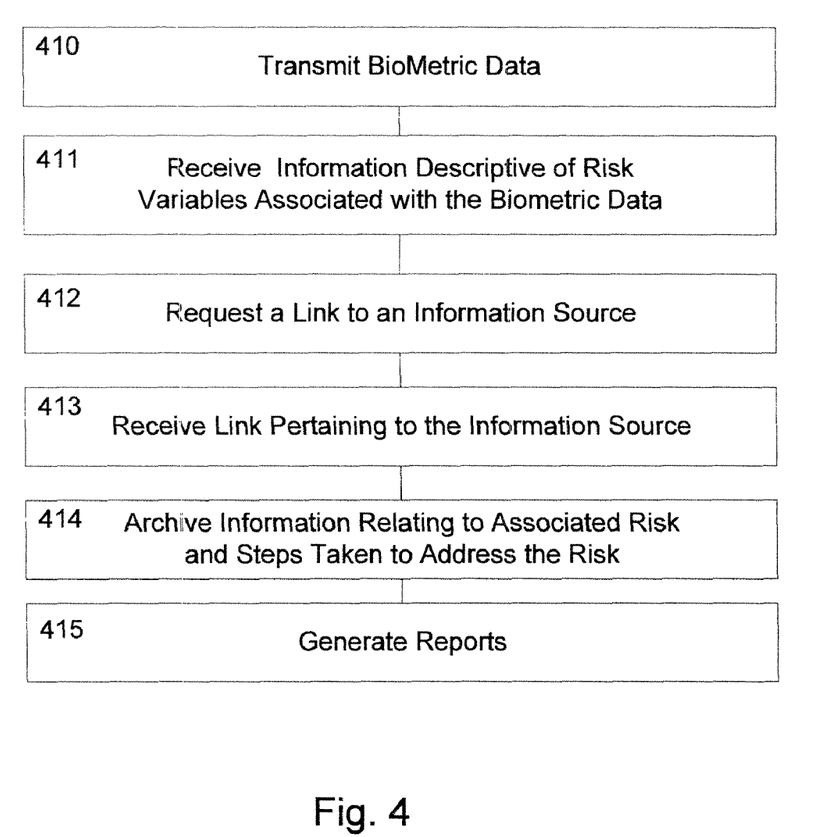
FIG. 4 illustrates a flow of exemplary steps that can be executed by a user while implementing the present invention.

Referring now to FIG. 4, a flow chart illustrates steps that a Subscriber or other user, can implement to manage Risk associated with a transaction. The Subscriber 111 transmit biometric data 410 to a RMC server 210. Transmission can be accomplished by opening a dialogue with a RMC system 210 with a network access device, 204-207, 212-214. Typically, the dialogue would be opened by presenting a GUI to a network access device accessible by a Subscriber 111. Other embodiments can include a dedicated line that can cause biometric profiles to be transmitted to the RMC server 210 as the biometric profiles are gathered. For example, embodiments can include a camera that feeds photo images of individuals that enter a facility in order to conduct a transaction, or photo images of individuals that actually request to perform a transaction. The RMC server 210 can analyze the photo images and perform a Risk inquiry based upon biometric profiles contained therein.

The Subscriber 111 can receive information descriptive of Risk variables associated with the biometric data 411. Therefore if a biometric profile is transmitted to an RCM server 211, the Subscriber will receive back information that relates to the individual described by the biometric profile and the information will be related to Risk variables, and useful to the Subscriber in ascertaining an amount of Risk the individual poses.

In some embodiments, a Subscriber can also request a link to a source of information 412 and receive a link or other description or the information source 413. Typically the request will be responsive to information received by the Subscriber 111. The source of information can facilitate a Subscriber's evaluation of the credibility of the source and therefore the information.

Records relating to information received and steps taken to determine and properly address associated Risk can be archived 414 and also utilized to generate reports 415 demonstrating proper due diligence.

In some embodiments, a user can receive ongoing monitoring of one or more biometric profiles. Any updated information or change of status detected via an ongoing monitoring can result in an alarm or other alert being sent to one or more appropriate Subscribers 111.

Figure 5:
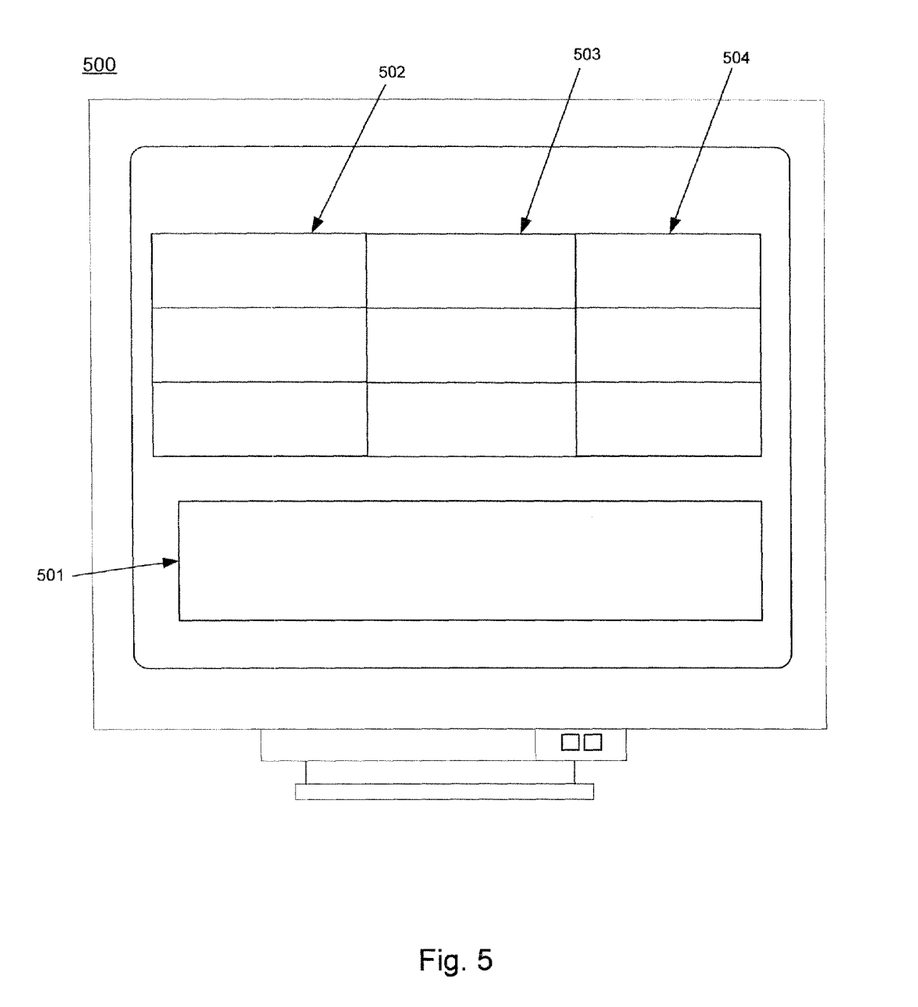
FIG. 5 illustrates an exemplary graphical user interface that can implement various aspects of the present invention.
Figure 6:
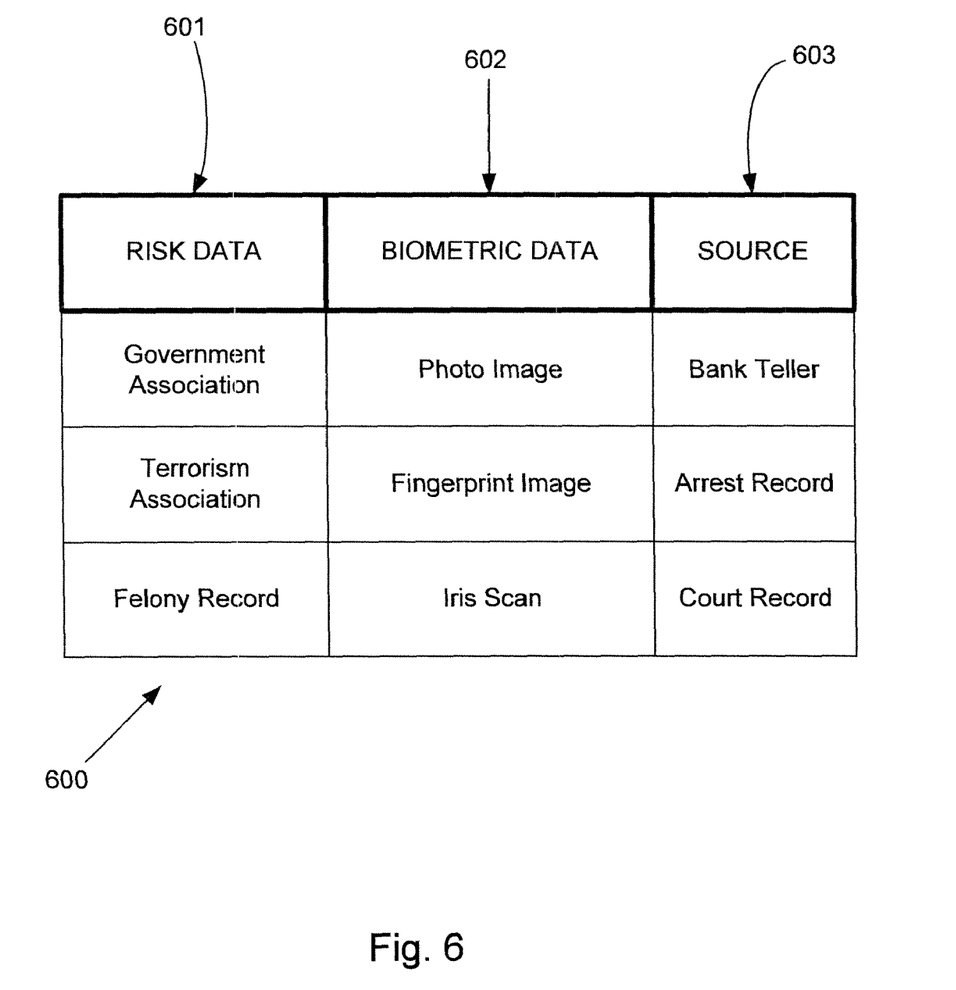
FIG. 6 illustrates an exemplary data structure that can be utilized to implement certain aspects of the present invention.

Referring now to FIG. 5, an exemplary GUI 500 that can be utilized while practicing the present invention is illustrated. A portion of a display 500 can display information that relates to a type of inquiry that will need to be performed 502, such as a one time search of Risk variable related data, or an ongoing alert for Risk variable related data. Another portion of the display can include a description of the biometric profile or data being considered in the inquiry 503. Still another portion can contain a destination for results of an inquiry to be sent to 504. Results of an inquiry, including risk variable information associated with a biometric profile can also be displayed in another portion 501 of the GUI 500.

A number of embodiments of the present invention have been described. Nevertheless, it will be understood that various modifications may be made without departing from the spirit and scope of the invention. For example, all devices involved in a RMC system 210 processing biometric data can be connected with wireless connections. In addition, an individual can submit to a biometric profile and protect the information in the profile with encryption or other securing method that renders the information unusable without a required a PIN number, key or other mechanism that can be utilized to decrypt the biometric information. Still other embodiments include biometric data that will expire and be locked after a set period of time has elapsed. Accordingly, other embodiments are within the scope of the following claims.

What is claimed is:

1. A processor-implemented method for managing risk related to a financial transaction, the method comprising:
   receiving, by a processor, a biometric search input including biometric profile data and financial transaction risk related variables used to identify a biometric profile;
   processing the biometric search input to extract the biometric profile data and the financial transaction risk related variables;
   determining a correlation factor for each of one or more biometric profiles, where each correlation factor indicates a mathematical likelihood of a relationship between the biometric profile and the extracted biometric profile data and the financial transaction risk related variables;
   selecting one or more biometric profiles that have a correlation factor above a minimum threshold;
   processing the selected biometric profiles and the financial transaction risk related variables to generate a risk quotient for each selected biometric profile; and
   generating a relevance ranked report of the selected biometric profiles.

2. The method of claim 1, further comprising:
   aggregating the financial transaction risk related variables and the biometric profile data into a data structure; and
   creating an index file for the data structure.

3. The method of claim 2, further comprising:
supplementing the selected biometric profiles by data mining the aggregated data structure.

4. The method of claim 1, further comprising:
associating the biometric search input with the selected biometric profiles.

5. The method of claim 1, wherein the minimum threshold is a user determined variable and included with the biometric search input.

6. The method of claim 1, wherein the minimum threshold is determined based on the extracted biometric profile data.

7. The method of claim 1, wherein the determining is based on a Boolean model.

8. The method of claim 1, wherein the determining is based on a relevance model.

9. The method of claim 1, wherein the biometric search input further includes a photo image.

10. The method of claim 9, wherein the biometric search input further includes a finger print.

11. The method of claim 10, wherein the biometric search input further includes a retina scan.

12. The method of claim 1, wherein the financial transaction risk related variables include money laundering or terrorist activity information.

13. The method of claim 12, wherein the financial transaction risk related variables further include translation of names in different languages.

14. The method of claim 1, wherein generating the relevance ranked report includes allowing a subscriber to set a threshold for inclusion in the report.

15. The method of claim 14, further comprising:
generating the relevance ranked report periodically.

16. A system for managing risk related to a financial transaction, comprising:
a memory;
a processor disposed in communication with said memory, and configured to execute a plurality of executable instructions stored in the memory, wherein the executable instructions direct the processor to:
receive a biometric search input including biometric profile data and financial transaction risk related variables used to identify a biometric profile;
process the biometric search input to extract the biometric profile data and the financial transaction risk related variables;
determine a correlation factor for each of one or more biometric profiles, where each correlation factor indicates a mathematical likelihood of a relationship between the biometric profile and the extracted biometric profile data and the financial transaction risk related variables;
select one or more biometric profiles that have a correlation factor above a minimum threshold;
process the selected biometric profiles and the financial transaction risk related variables to generate a risk quotient for each selected biometric profile; and
generate a prioritized report of the selected biometric profiles.

17. The system of claim 16, wherein the executable instructions further direct the processor to:
generate the prioritized report periodically.

18. The system of claim 16, wherein the executable instructions further direct the processor to:
aggregate the financial transaction risk related variables and the biometric profile data into a data structure; and
create an index file for the data structure.

19. The system of claim 18, wherein the executable instructions further direct the processor to:
supplement the selected biometric profiles by data mining the aggregated data structure.

20. The system of claim 16, wherein the executable instructions further direct the processor to:
extract a user determined biometric correlation threshold variable included with the biometric search input.

21. The system of claim 16, wherein the executable instructions further direct the processor to:
determine a biometric correlation threshold variable based on the extracted biometric profile data.

22. A financial transaction risk managing processor-readable medium storing a plurality of processing instructions, comprising issuable instructions by a processor to:
receive a biometric search input including biometric profile data and financial transaction risk related variables used to identify a biometric profile;
process the biometric search input to extract the biometric profile data and the financial transaction risk related variables;
determine a biometric correlation threshold;
determine a correlation factor for each of one or more biometric profiles, where each correlation factor indicates a mathematical likelihood of a relationship between the biometric profile and the extracted biometric profile data and the financial transaction risk related variables;
select one or more biometric profiles that have a correlation factor above the biometric correlation threshold;
process the selected biometric profiles and the financial transaction risk related variables to generate a risk quotient for each selected biometric profile; and
generate a prioritized report of the selected biometric profiles.

* * * * *